(12) United States Patent
Oguchi

(10) Patent No.: US 7,574,522 B2
(45) Date of Patent: *Aug. 11, 2009

(54) COMMUNICATION DATA RELAY SYSTEM

(75) Inventor: Naoki Oguchi, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 683 days.

This patent is subject to a terminal disclaimer.

(21) Appl. No.: 09/825,178

(22) Filed: Apr. 3, 2001

(65) Prior Publication Data
US 2002/0023152 A1 Feb. 21, 2002

(30) Foreign Application Priority Data
Apr. 4, 2000 (JP) .............................. 2000-102702

(51) Int. Cl.
G06F 15/173 (2006.01)
G06F 15/16 (2006.01)

(52) U.S. Cl. ...................................... 709/238; 709/218

(58) Field of Classification Search ................. 709/203, 709/226, 223, 245, 238, 244, 218

See application file for complete search history.

(56) References Cited

U.S. PATENT DOCUMENTS

| 5,493,607 | A | * | 2/1996 | Arumainayagam et al. | 379/88.18 |
| 5,825,772 | A | * | 10/1998 | Dobbins et al. | 370/396 |
| 6,192,051 | B1 | * | 2/2001 | Lipman et al. | 370/389 |
| 6,615,273 | B1 | * | 9/2003 | Pan | 709/242 |
| 6,772,219 | B1 | * | 8/2004 | Shobatake | 709/238 |
| 7,016,980 | B1 | * | 3/2006 | Mayer et al. | 709/249 |
| 7,139,838 | B1 | * | 11/2006 | Squire et al. | 709/242 |
| 7,197,044 | B1 | * | 3/2007 | Kadambi et al. | 370/418 |
| 7,272,625 | B1 | * | 9/2007 | Hannel et al. | 709/224 |
| 2001/0014912 | A1 | * | 8/2001 | Segal | 709/223 |

FOREIGN PATENT DOCUMENTS

JP 8-46617 2/1996

* cited by examiner

Primary Examiner—Jeffrey Pwu
Assistant Examiner—Benjamin R Bruckart
(74) Attorney, Agent, or Firm—Katten Muchin Rosenman LLP

(57) ABSTRACT

A technology in a relay system for relaying communication data between a plurality of domains by an address translation, is capable of executing, even when there are both streams of inter-domain and intra-domain communications, the communications with security ensured without setting a complicated packet filter between the domains, and routing a packet at a high speed within the domain.

3 Claims, 22 Drawing Sheets

| SOURCE DOMAIN → DESTINATION DOMAIN | COMMUNICABILITY (1:PERMITTED 0:PROHIBITED) | TRANSLATION RULE |
|---|---|---|
| DOMAIN 0→DOMAIN 1 | 0 | - |
| DOMAIN 0→DOMAIN 2 | 0 | - |
| DOMAIN 1→DOMAIN 0 | 1 | NAT |
| DOMAIN 1→DOMAIN 2 | 0 | - |
| DOMAIN 2→DOMAIN 0 | 1 | NAT |
| DOMAIN2→DOMAIN 1 | 1 | NAT |

FIG.6

| I/F NUMBER | DOMAIN NUMBER |
|---|---|
| de0 | 0 |
| de1 | 1 |
| de2 | 2 |
| de3 | 2 |

*FIG.7*

| SOURCE DOMAIN → DESTINATION DOMAIN | COMMUNICABILITY (1:PERMITTED 0:PROHIBITED) | TRANSLATION RULE |
|---|---|---|
| DOMAIN 0→DOMAIN 1 | 0 | - |
| DOMAIN 0→DOMAIN 2 | 0 | - |
| DOMAIN 1→DOMAIN 0 | 1 | NAT |
| DOMAIN 1→DOMAIN 2 | 0 | - |
| DOMAIN 2→DOMAIN 0 | 1 | NAT |
| DOMAIN2→DOMAIN 1 | 1 | NAT |

FIG.8

| DESTINATION NETWORK | NEXT HOP GATEWAY | OUTPUT INTERFACE |
|---|---|---|
| 100.10.5.0 | 120.10.4.1 | de0 |
| 100.10.6.0 | 120.10.4.120 | de0 |
| 120.10.4.0 | 120.10.4.120 | de0 |

FIG.9

| DESTINATION NETWORK | NEXT HOP GATEWAY | OUTPUT INTERFACE |
|---|---|---|
| 10.25.55.0 | 10.25.55.1 | de1 |
| 10.25.165.0 | 10.25.55.165 | de1 |
| 10.25.166.0 | 10.25.55.166 | de1 |

*FIG.10*

| DESTINATION NETWORK | NEXT HOP GATEWAY | OUTPUT INTERFACE |
|---|---|---|
| 192.168.100.0 | 192.168.100.1 | de2 |
| 192.168.250.0 | 192.168.100.250 | de2 |
| 192.168.251.0 | 192.168.100.251 | de2 |
| 192.172.30.0 | 192.168.30.1 | de3 |
| 192.172.38.0 | 192.168.30.38 | de3 |

FIG.11

| BEFORE TRANSLATION | | RECEIVING I/F | AFTER TRANSLATION | | FORWARDING I/F |
|---|---|---|---|---|---|
| SOURCE ADDRESS | DESTINATION ADDRESS | | SOURCE ADDRESS | DESTINATION ADDRESS | |
| 192.168.5.1 | 100.10.5.2 | de2 | 120.10.4.2 | 100.10.5.2 | de0 |
| 192.172.3.1 | 100.10.6.7 | de3 | 120.10.4.3 | 100.10.6.7 | de0 |

*FIG.12*

| DESTINATION NETWORK | NEXT HOP GATEWAY | OUTPUT INTERFACE | DOMAIN NUMBER |
|---|---|---|---|
| 100.10.5.0 | 120.10.4.1 | de0 | 0 |
| 100.10.6.0 | 120.10.4.120 | de0 | 0 |
| 120.10.4.0 | 120.10.4.120 | de0 | 0 |
| 10.25.55.0 | 10.25.55.1 | de1 | 1 |
| 10.25.165.0 | 10.25.55.165 | de1 | 1 |
| 10.25.166.0 | 10.25.55.166 | de1 | 1 |
| 192.168.100.0 | 192.168.100.1 | de2 | 2 |
| 192.168.250.0 | 192.168.100.250 | de2 | 2 |
| 192.168.251.0 | 192.168.100.251 | de2 | 2 |
| 192.172.30.0 | 192.168.30.1 | de3 | 2 |
| 192.172.38.0 | 192.168.30.38 | de3 | 2 |

FIG.16

| BEFORE TRANSLATION | | | AFTER TRANSLATION | | |
|---|---|---|---|---|---|
| SOURCE ADDRESS | DESTINATION ADDRESS | RECEIVING I/F | SOURCE ADDRESS | DESTINATION ADDRESS | FORWARDING I/F |
| 192.168.5.1 | 192.168.5.2 | de2 | 120.10.4.2 | 100.10.5.2 | de0 |

COMMUNICATION DATA RELAY SYSTEM

BACKGROUND OF THE INVENTION

The present invention relates to a relay system in a network.

(Concept of Domain)

A routing domain has hitherto been thought as follows. The routing domain is configured with one or more networks. The routing domain is defined as a range in which a network layer packet managed by one or more routing protocols cooperating with each other is reachable. For example, the Internet is configured by a plurality of networks where a variety of routing protocols function. Therefore, the Internet may be conceived as one routing domain (which will hereinafter simply be referred to as a domain).

A multiplicity of enterprises have been configuring by now intra-organization networks (Intranets) using the Internet technology as company's own information infrastructures. The Intranet needs a Fire Wall provided between the Internet and the Intranet itself in order to keep a confidentiality of the enterprise and to block an interference from outside. The Fire Wall monitors and restricts the communications with the Internet. It is a general practice in the Intranet that pieces of internal routing information in the Intranet are not distributed to the Internet for the reason of security. Further, the Intranet generally uses private addresses because of a deficiency of IPv4 addresses.

The private address is within a category of the Internet address that an office user can use as the user intends. It is, however, inhibited to distribute these pieces of routing information to the Internet. The Intranet using the private addresses is therefore incapable of communicating directly with the Internet. Accordingly, the intranet may be defined as a domain independent of the Internet.

It is required that a NAT ((IP)NetworkAddressTranslation) device be used for the Intranet to communicate with the Internet. The NAT device translates a private address attached to the packet into a global address at a boundary between the two domains in order to let the packet having the private address go through the Internet in which routing is conducted based on the global address.

Further, a router comes to have a NAT function (which will hereinafter be referred to as a NAT router) in order to correspond to a more complicated architecture of the Intranet and more diversified router functions. This type of router is capable of managing two domains.

Under such circumstances, a communication from the domain using the private address (which will hereinafter be called a private address domain) to a domain using the global address (which will hereinafter be called a global address domain), is performed as follows.

Namely, a default route is set so that each of the routers within the private address domain forwards all the packets of which destination addresses are other than within the Intranet to the NAT router. The packets addressed to the global address domain can be thereby sent to a relay system provided at the domain boundary (which will hereinafter be termed a domain boundary relay system).

This domain boundary relay system does not distribute the routing information of the private address domain to the global address domain, and distributes the routing information obtained from the global address domain to the private address domain. With this contrivance, each host (node) in the private address domain is capable of sending the packet addressed to the global address domain to the relay system.

The domain boundary relay system obtains a next hop router within the global address domain from the routing information received from the global address domain (an external router is in fact specified as a default route in the relay system as the case may be). Thus, the domain boundary relay system is capable of routing the packet to an interface directed to the global address domain. At this time, as a matter of fact, the domain boundary relay system translates a packet address before being routed.

The address is translated by a few methods. For instance, at first, the relay system provided at the boundary between the domains pools some global addresses. This domain boundary relay system replaces a source address categorized as a private address of the packet arrived with one of the global addresses pooled (which will hereinafter be called an Alias address).

Next, this domain boundary relay system forwards the packet as if being a source host within the global address domain. At this time, the domain boundary relay system records a mapping of the source address replaced to that Alias address. Then, the domain boundary relay system, when receiving a response traffic with respect to the packet transmitted using alias address, transmits the packet backward to the original source host within the private address domain.

When a response packet to a preceding packet forwarded to the global address domain from the private address domain is returned, the destination address may be conceived as the Alias address. Namely, in the global address domain, the source address of the preceding packet is the Alias address of the relay system. Therefore, the domain boundary relay system refers to the previous address translation table from private address into the global address and vice versa, and is capable of thus translating the packet destination address into a source address of the private address domain. Thus, the domain boundary relay system output the reply packet to the interface connected to the private address domain.

The communications between the two domains can be performed owing to the address translation function described above. In this case, the communication in a forward direction requires a routing table in the destination domain. On the other hand, if the address translation table is set to record the private address and the global address together the interface receiving the forward-streamed packet, the relay system may transfer a backward-streamed packet to its receiving interface. On this occasion, the relay system searches the routing information of the source domain, then determines a next hop router in the private address domain, and transfers the packet to the above interface.

The domain boundary relay system in the prior art has a routing control program that terminates a plurality of routing protocols and only one routing table. Note that the routing table categorized herein is a table to be searched in order to determine an output interface and a next hop router when routing the packet.

The conventional relay system executes management control as to whether or not pieces of routing information obtained by the plurality of routing protocols are mixed with each other. If mixed with each other, however, the prior art relay system writes all pieces of routing information obtained from the plurality of routing protocols to the same routing table. Namely, the relay system provided at the boundary between the private address domain and the global address domain, manages the routing information obtained from the domains within the one single table.

(Example of IP Navigator by Lucent Technologies Corp.)

FIG. 19 shows an outline of processing of IP Navigator by Lucent Technologies Corp. The IP Navigator is a communication program for supporting a plurality of routing tables. The IP Navigator runs on a relay system (which will hereinafter be called a router) that equips MPLS (Multi Protocol Label Switching) protocol as a technology for ISP (Internet Service Provider) network.

This IP Navigator segments an ISP (Internet Service Provider) network into partitions by making an LSP (Label Switch Path) for connecting the routers corresponding to each of the plurality of routing tables in an LSR (Label Switch Router). Then, the IP Navigator aims at providing the office user with each partition as a private network. According to this method, the routing tables are provided to the plurality of domains. This method is, however, incapable of performing the communications between an arbitrary couple of domains through the address translation function.

(Implementation of IPv6 Router)

An IP protocol (Ipversion4 that will hereinafter be abbreviated to IPv4) has been used up to now as a typical network layer protocol. Further, a new version (Ipversion6 abbreviated to IPv6) of the IP protocol comes to an advent to obviate the deficiency of the IP addresses. IPv4 and IPv6 coexist at the present. Generally, the IPv4 domain and the IPv6 domain communicate with each other by use of an address translator. There is a router (such as NR60 manufactured by Hitachi Ltd.) corresponding to these two domains, by which the IPv4 domain having an IPv4 routing table and the IPv6 domain having an IPv6 routing table are communicable with each other by translating the addresses.

This type of router has the plurality of routing tables for the two IPv4 and IPv6 domains, and is capable of performing the communications between the two domains by the address translation. A user is, however, unable to further define a domain in an IP address space and connect the two or more domains as the user intends through the address translation.

(Unidirectional NAT)

FIG. 20 shows an outline of a unidirectional NAT. The unidirectional NAT actualizes the communications under such a condition that the routing information of a domain 1 is unable to be distributed to a domain 2 as with the private address and the global address. The domain 1 can get informed of a route to the domain 2 and is therefore capable of routing the packet addressed to the domain 2.

The NAT device translates a source address of the packet passing therethrough into an Alias address assigned to own interface directed to the domain 2. The NAT device forwards the packet with its address translated to the domain 2, and stores the mapping between the Alias address and the source address before being translated.

With this operation, a receiving host within the domain 2 forwards a response packet toward the Alias address. Namely, the domain 2 is uninformed of the route to the domain 1 but is capable of replying the packet to the translated Alias address of the NAT device.

Further, the NAT device re-forwards the packet received with this Alias address toward the original source address stored on the side of the domain 1 using the mapping between the Alias address and the source address.

In this case, the routing tables of the NAT device are those not separated according to the domain 1 and the domain 2. If the packet addressed to the domain 1 from the domain 2 is received by a forwarding interface, this packet might be forwarded referring to the routing table. Therefore, a packet filter against an unauthorized packet is needed.

(Bidirectional NAT)

FIG. 21 shows an outline of a bidirectional NAT. The bidirectional NAT actualizes the communications under such a condition that neither the domain 1 nor the domain 2 can exchange the routing information with each other. When a host in the domain 1 starts the communication with a host in the domain 2, the host in the domain 1 executes a name resolution by use of DNS (Domain Name System) in advance of the communications.

A resolution request in the domain 1 is sent via a DNS server within the domain 1 and translated by a translation server on the NAT device into a resolution request within the domain 2. When a resolution response is returned from the DNS server in the domain 2, the NAT device sets, in the respective interfaces, the pooled Alias addresses suited to the domain 1 and the domain 2. Then, the NAT device notifies the inquirer host in the domain 1 of the Alias address on the side of this domain 1. The NAT device records a mapping of the resolution address received from the domain 2 to each Alias address.

The source host transmits the packet to the Alias address of the NAT device on the side of the domain 1. The NAT device translates a destination address of the header into an address obtained from the DNS of the domain 2 owing to the resolution response and translates a source address into an Alias address on the side of domain 2 by use of the mapping given above. In this case, there is no problem if the address systems are absolutely different as in the case of IPv4 and IPv6. In an architecture wherein both of the domains are configured as being a part of the IPv4 address space, however, if the NAT device receives a malicious packet with an interface address other than the Alias address, and if the packet filter is not set correctly, the NAT device might forward this packet.

(Application Gateway)

The domains can be also isolated by using an application gateway. FIG. 22 shows an outline of the application gateway.

An application program 40 on the application gateway once terminates the communication from the domain 1, and receives the data. Further, this application program 40 retransmits the data onto the connection on the side of the domain 2. This method involves preparing on the gateway the application program 40 corresponding to an application used by an end host. Moreover, a problem inherent in this method is that the processing is heavy.

(Address Translator Corresponding to Plural Domains)

A router supporting a plurality of domains has been proposed. The conventional router of the type is provided with a single routing table. Further, the router uses the packet filter that blocks packets ruled out of an address translation policy between the domains. This type of router can be utilized in a simple setting. The prior art router becomes, however, intricate in processing if there are a multiplicity of management domains. Further, it is required that a judgement about the inter-domain communications be made with respect to all the packets.

(Problems)

According to an address translation algorithm such as the NAT etc, the router performs a forward-streamed packet transfer by searching the routing table after executing the address translation process. The router sets the packet filter with respect to the packet's source/destination addresses, thereby judging whether the packet should be routed or not. On the other hand, the router behaves as if being a source host for the global address domain with respect to backward-streamed packets. Then, the router as an end host terminates the packet addressed to the global address pooled in the router.

Similarly, the router judges whether or not a packet addressed to the private address domain and arrived from the global address domain should be routed between the domains through the packet filter. Therefore, if a malicious packet addressed to the private address domain arrives at the router, and if the packet filter is not correctly set, the router refers to only one routing table and might forward this malicious packet to the private address domain. This implies a possibility in which a multiplicity of unknown packets are to be unexpectedly received from the Internet, and might turn out to be a security hole.

Moreover, it is assumed in the router capable of connecting the plurality of domains that each domain takes the same private address space. In this case, if the router writes the routing information obtained from the respective domains to one single routing table, contradictions occur in the routing table.

To obviate the problem described above, the packet filter can restrict the packet from the global address domain not to be forwarded. If the number of domains that can be managed increases, however, the setting becomes complicated.

For example, the packet filter is capable of restricting the packet routing, wherein an input interface, and output interface, a source address, a destination address, a L4 (Layer 4) port number etc are available as keys. If the multiplicity of domains are connected by a router having the multiplicity of interfaces, it is troublesome to set a filtering condition for every couple of domains. Further, the router having such an architecture contains a possibility in which a mistake in setting might be induced. Moreover, this kind of complicated filtering process becomes a burden for the router, with the result that a high-speed routing process is hard to take place.

SUMMARY OF THE INVENTION

It is a primary object of the present invention, which was devised to obviate the problems inherent in the prior art, to provide a technology capable of executing, even when there are both streams of inter-domain and intra-domain communications, communications with security ensured without setting a complicated packet filter between the domains, and routing a packet at a high speed within the domain in a relay system for relaying communication data between a plurality of domains by an address translation.

To accomplish the above object, according to one aspect of the present invention, a communication data relay system for relaying between two or more domains each configured by one or more networks, a relay source domain having routing information to a relay destination domain, comprises two or more interface modules for accessing the network, a domain definition module for defining the domain configured by one or more networks, an inter-domain communication definition module for defining a communicability between the domains, a routing information storage module for storing pieces of routing information each indicating a relay destination of communication data in a way that separates the routing information for every domain, and a relay control unit for controlling relay of the communication data. In this communication data relay system, the relay control unit controls the relay of the communication data with reference to the routing information storage module corresponding to the domain concerned with respect to the relay within the same domain, and judges a connectability for the relay in accordance with definitions in the inter-domain communication definition module with respect to a relay between the domains different from each other.

The communication data relay system may further comprise a destination address search module for the relay destination domain. If the relay source domain does not have routing information to the relay destination domain, the destination address search module may search a destination address to the relay destination domain in response to a request from a source communication device within the relay source domain, and notify the source communication device of a relay address within the relay source domain that corresponds to the destination address. The relay control unit may relay the communication data addressed to the relay address to the destination address in the relay destination domain.

This destination address search module is structured to search an address from an network name of a communication device like DNS system. This destination address search module may also be structured to request other communication device to search a destination address.

The communication data relay system may further comprise a routing control information storage module for the domain to which a communication data processing device for processing the communication data is connected. The relay control unit, when controlling the relay of the communication data, may cause the communication data processing device to process the communication data, and relays the thus processed communication data. The communication data processing device is herein a device for, e.g., checking a content of the communication data.

As described above, according to the present invention, the communication data relay system for relaying between the two or more domains each configured by connecting one or more networks, includes the domain definition module for defining the domain configured by one or more networks, the inter-domain communication definition module for defining a communicability between the domains, and the routing information storage module for storing the routing information indicating the relay destination of communication data in a way that separates the routing information for every domain. The relay control unit controls the relay of the communication data with reference to the routing information storage module corresponding to the domain concerned with respect to the relay within the same domain, and judges the connectability for the relay in accordance with definitions in the inter-domain communication definition module with respect to the relay between the domains different from each other. Accordingly, it is feasible to route the packet at a high speed within the domain and to execute, even when there are both streams of inter-domain and intra-domain communications, the communications with security ensured without setting a complicated packet filter between the domains.

BRIEF DESCRIPTION OF THE DRAWINGS

FIG. 6 is a chart showing a data structure of a domain definition table;

FIG. 7 is a chart showing a data structure of an inter domain connection definition table;

FIG. 8 is a chart (1) showing a data structure of a destination domain routing table;

FIG. 9 is a chart (2) showing a data structure of the destination domain routing table;

FIG. 10 is a chart (3) showing a data structure of the destination domain routing table;

FIG. 11 is a chart showing a data structure of an address translation table;

FIG. 12 is a chart showing an example of a data structure of an actual routing table;

FIG. 16 is a chart showing a registered result by the address translation pre-registering module in an address translation table;

DETAILED DESCRIPTION OF THE PREFERRED EMBODIMENTS

Preferred embodiments of the present invention will hereinafter be described with reference to the accompanying drawings.

First Embodiment

A first embodiment of the present invention will hereinafter be discussed referring to FIGS. 1 through 12.

Figure 1:
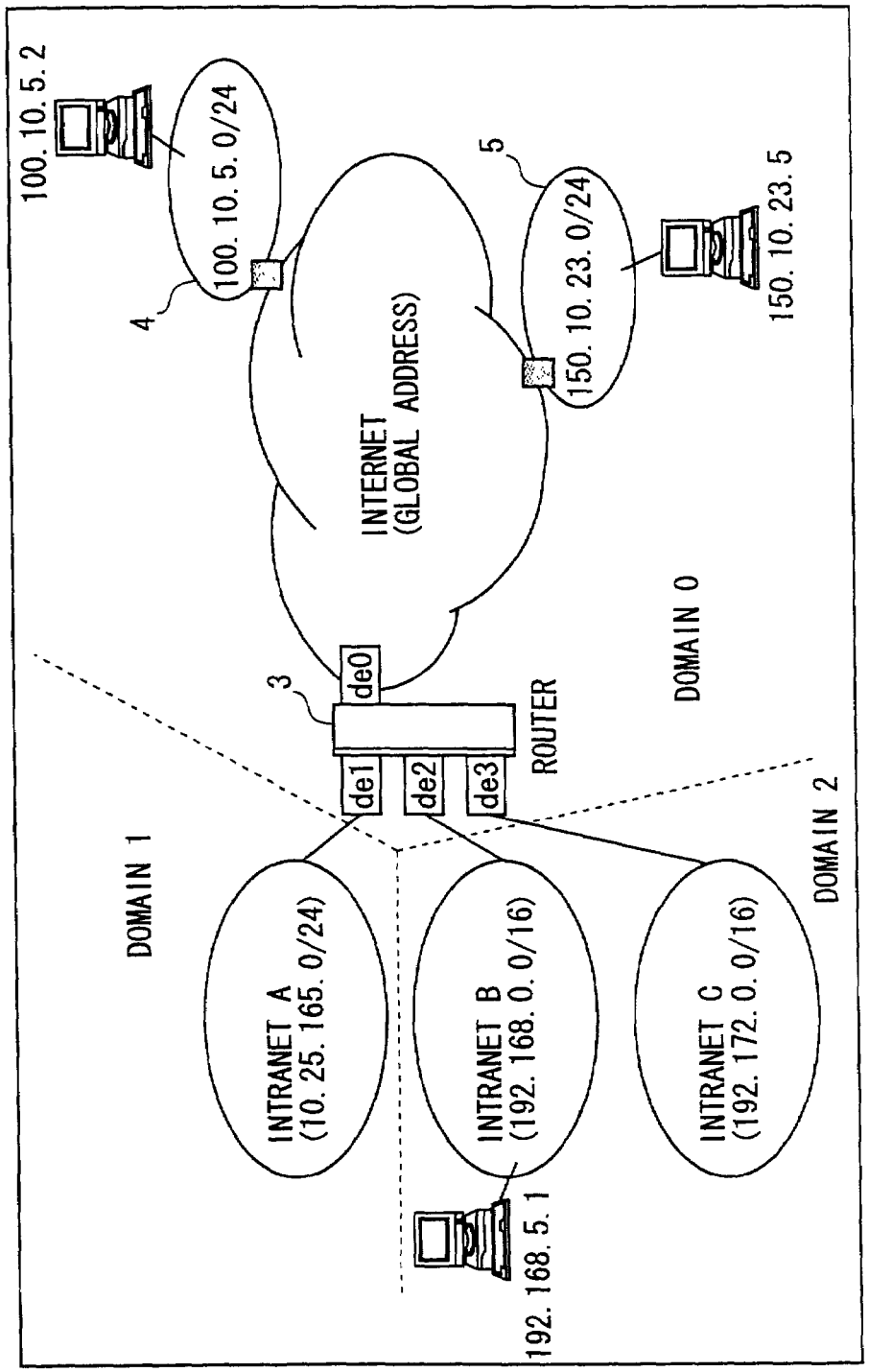
FIG. 1 is a view showing a network architecture in a first embodiment of the present invention.
Figure 2:
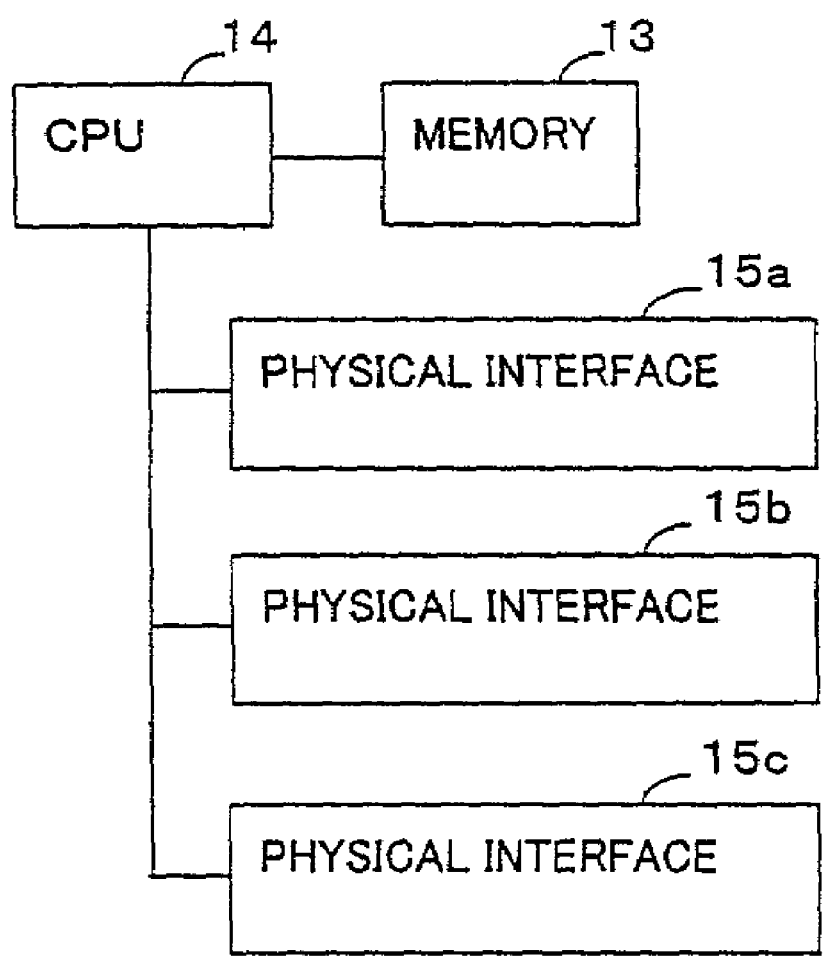
FIG. 2 is a diagram showing a hardware architecture of a router in the first embodiment of the present invention.
Figure 3:
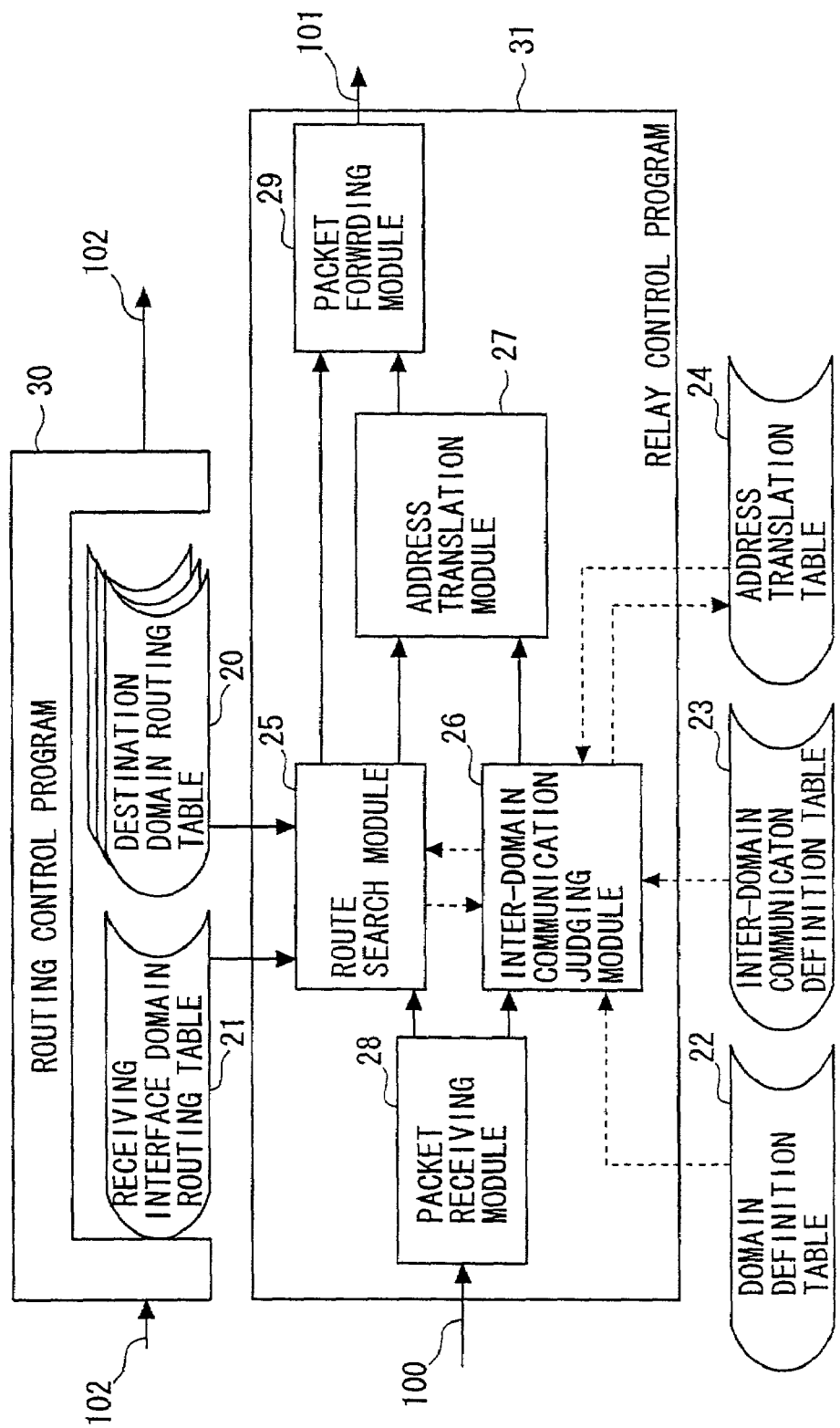
FIG. 3 is a view showing an architecture of functions of the router in the first embodiment of the present invention.
Figure 4:
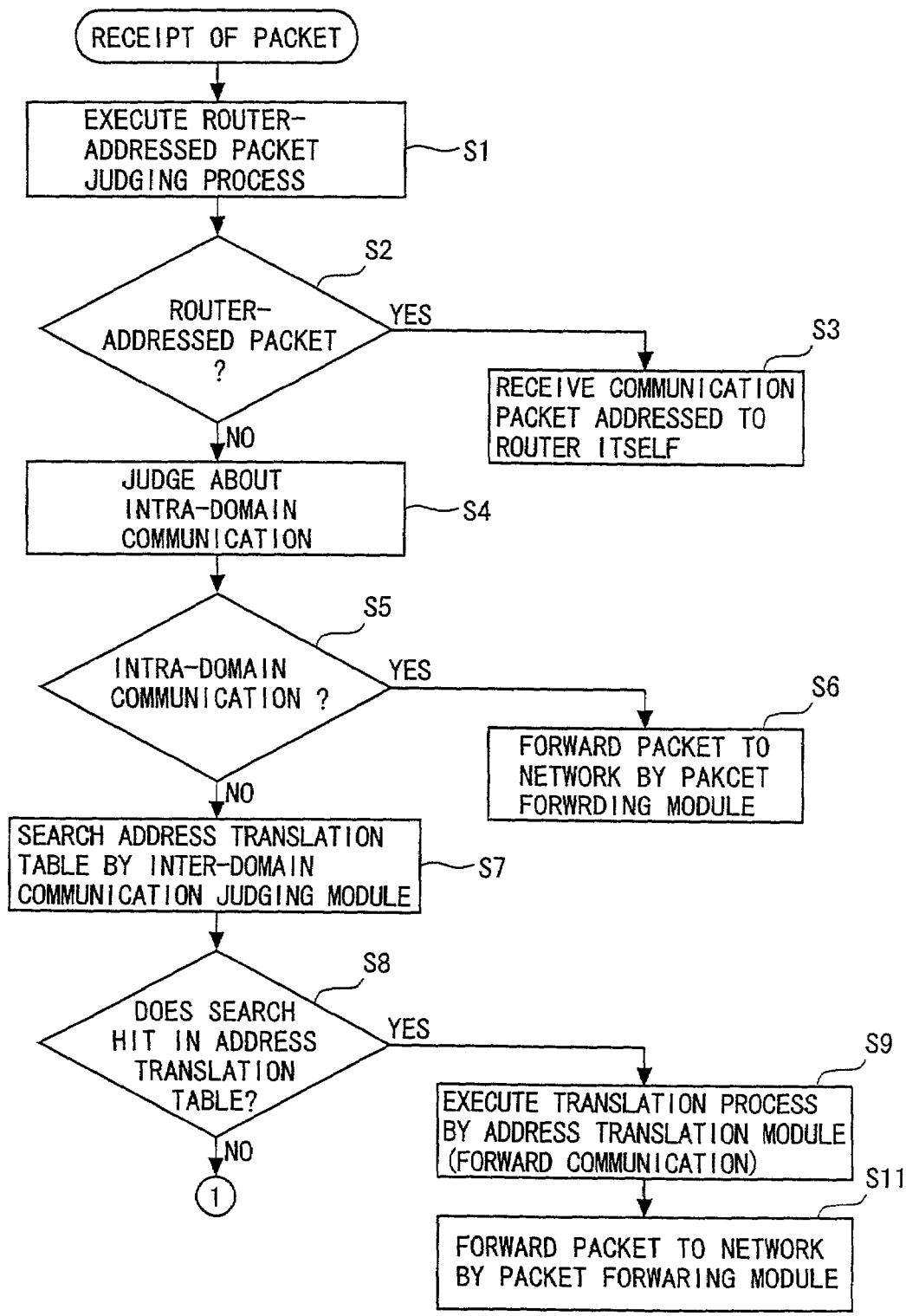
FIG. 4 is a flowchart (1) showing processes of a control program.
Figure 5:
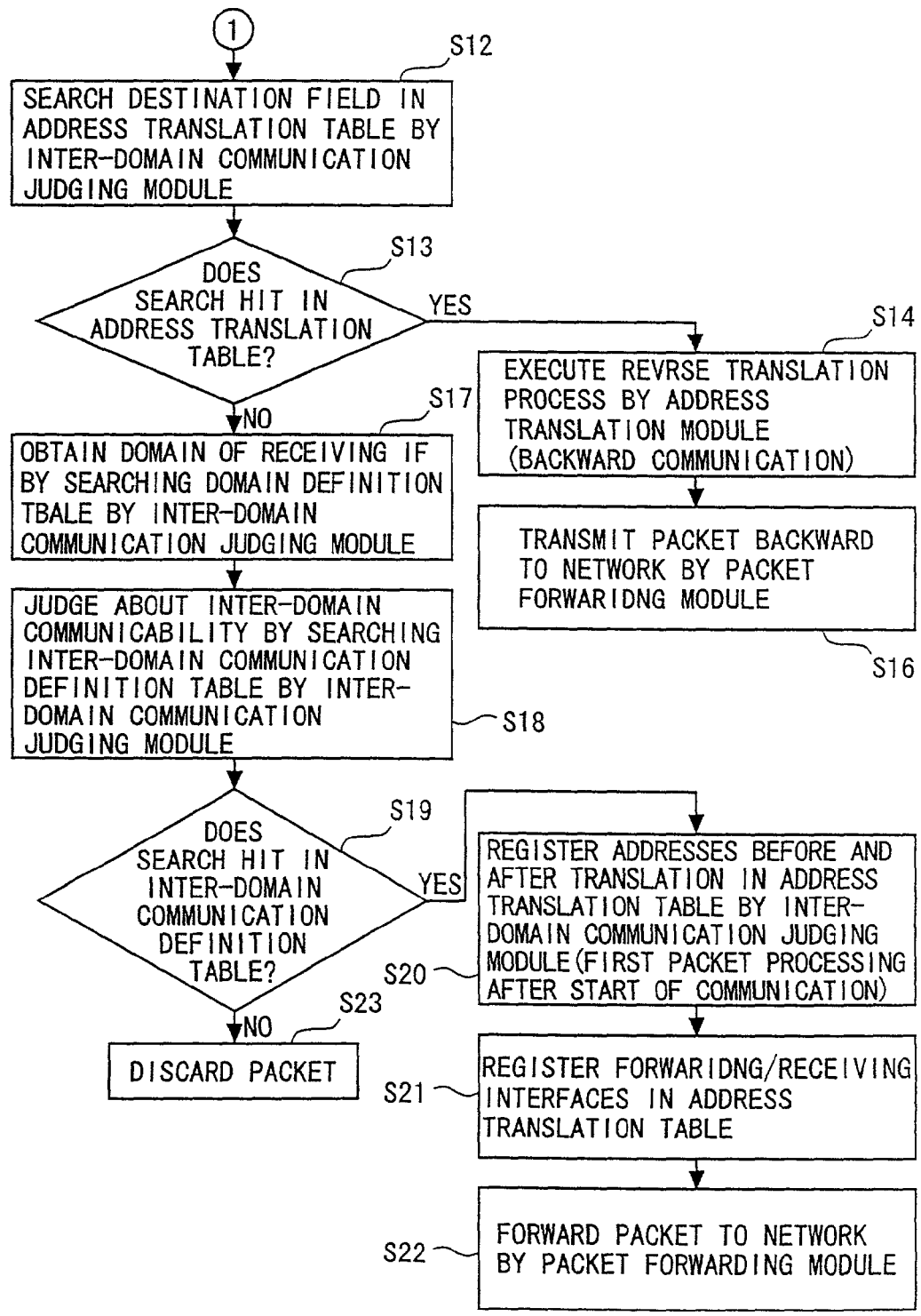
FIG. 5 is a flowchart (2) showing processes of the control program.

FIG. 1 is a view showing a network architecture in the first embodiment. FIG. 2 is a diagram showing a hardware architecture of a router 3 shown in FIG. 1. FIG. 3 is a diagram showing functions of the router 3. FIG. 4 and FIG. 5 are flowcharts showing processes of a control program executed by a CPU 14 shown in FIG. 2. FIGS. 6 through 12 are diagrams each showing a data structure of data dealt with by the CPU 14.

<Network Architecture>

FIG. 1 is the view showing the network architecture in the first embodiment. As shown in FIG. 1, in the first embodiment, the router 3 connects Intranets A, B, C to the Internet. As illustrated in FIG. 1, the router 3 connects the networks via logical interfaces de0, de1, de2 and de3 (which correspond to interface modules).

A private address of the Intranet A is 10.25.165.0/24. The Intranet A solely configures a domain 1. The Intranet A is connected to the interface de1 of the router 3. This Intranet A becomes connectable to the Internet by executing an address translation in the router 3.

A private address of the Intranet B is 192.168.0.0/16. A communication device 192.168.5.1 is connected to the Intranet B. The Intranet B is connected to the interface de2 of the router 3. This Intranet B also becomes connectable to the Internet via the router 3.

A private address of the Intranet C is 192.172.0.0/16. The Intranet C is connected to the interface de3 of the router 3. This Intranet C is also connectable to the Internet via the router 3. Further, the Intranets B and C configure a domain 2.

The Internet is accessed with a global address. Further, networks 4 and 5 are connected to the Internet. Moreover, the Internet is connected to the interface de0 of the router 3.

A global address of the network 4 is 100.10.5.0/24. Further, a communication device 100.10.5.2 is connected to the network 4.

A global address of the network 5 is 150.10.23.0/24. Further, a communication device 150.10.23.5 is connected to the network 5. The internet and the networks 4, 5 configure a domain 0.

The respective domains shown in FIG. 1 execute independent routing controls with no reachability to each other on the network layer. Moreover, in the first embodiment, connections to the domains 0 and 1 from the domain 2 are permitted by executing the address translation. While on the other hand, a connection (communication) from the domain 1 to the domain 2 is not permitted. A connection to the domain 0 from the domain 1 is permitted by translating addresses.

<Hardware Architecture of Router 3>

FIG. 2 is a diagram showing a hardware architecture of the router 3 in the first embodiment.

This router 3 includes a memory 13 for storing a control program and data, a CPU 14 for executing the control program stored in the memory 13, and a plurality of physical interfaces 15a, 15b, 15c controlled by the CPU 14 to perform communications with other communication devices.

The memory 13 is stored with the control program executed by the CPU 14 and the data processed by the CPU 14.

The CPU 14 executes the control program stored in the memory 13, thereby providing a function as the router 3.

The physical interfaces 15a, 15b, 15c send or receive the communication data to or from a network 10 in response to a command given from the CPU 14.

<Architecture of Functions>

FIG. 3 is a diagram showing an architecture of functions of the router 3. The CPU 14 executes a relay control program 31 and a routing control program 30, thereby providing a function of the router 3. Further, a function of the relay control program may be actualized not based on the CPU but by hardware.

The relay control program 31 includes a packet receiving module 28, a route search module 25, a, inter-domain communication judging module 26, an address translation module 27, and a packet forwarding module 29. The CPU 14 executing this relay control program corresponds to a relay control unit.

On the other hand, the CPU 14 executes the routing control program 30 separately from the relay control program 31. The CPU 14 thereby exchanges routing information with respect to other communication devices and other routers.

[Destination Domain Routing Table 20]

An Destination domain routing table 20 is a table registered with a forwarding interface corresponding to a destination network.

FIGS. 8, 9 and 10 show examples of the destination domain routing table 20 in which destinations are the domains 0, 1 and 2. In the first embodiment, the destination domain routing table 20 contains addresses of the destination networks, addresses of next hop gateways and pieces of information for identifying the forwarding interfaces corresponding to the destination networks.

Further, as shown in FIGS. 8, 9 and 10, the destination domain routing table 20 in the first embodiment takes an independent table structure for every destination domain.

The CPU 14, when routing a packet, refers to the destination domain routing table 20 and determines an output interface.

[Receiving Interface Domain Routing Table 21]

A receiving interface domain routing table 21 is stored with routing information of the domain corresponding to the interface that receives the packet (which will hereinafter be called a receiving interface). This receiving interface domain routing table 21 and the destination domain routing table 20 described above, correspond to a routing information storage module.

[Domain Definition Table 22]

A domain definition table 22 is a table (corresponding to a domain definition module) containing definitions of the domains corresponding to the respective interfaces. FIG. 6 shows an example of definitions in the domain definition table 22 in the first embodiment.

As shown in FIG. 6, the domain definition table 22 in the first embodiment is stored with information (interface numbers) for identifying the interfaces, and information (domain numbers) for identifying the domains. For instance, a domain corresponding to an interface number de0 is the domain 0.

Note that a logical interface as a substitute for the physical interface may be registered.

[Inter-Domain Communication Definition Table 23]

An inter-domain communication definition table 23 is a table (corresponding to an inter-domain communication definition module) in which a connectability of each domain defined in the domain definition table 22 with other domain is defined. FIG. 7 shows an example of the definitions in the inter-domain communication definition table 23 in the first embodiment.

As shown in FIG. 7, the inter-domain communication definition table 23 has records each consisting of a source domain→destination domain field, an inter-domain communicability field and a translation rule (address translation mode) field. According to setting in the first embodiment, for example, the communications from the domain 0 to the domains 1 and 2 are not permitted. Further, the communications from the domain 2 to the domains 0 and 1 are permitted, and NAT is applied as a translation rule.

[Address Translation Table 24]

An address translation table 24 is a table showing a mapping of a set of records before the translation to a set of records after the translation. FIG. 11 shows an example of the address translation table 24 in the first embodiment.

As shown in FIG. 11, the address translation table 24 has a set of records each consisting of a source address field, a destination address field and a receiving interface field before the translation, and a set of records after the translation. The data in these fields are set when a packet transmitted to its destination from a source passes at first through the router 3. Thereafter, the address translation table 24 is referred to in the communications of the second and subsequent packets.

[Route Search Module 25]

A route search module 25 searches the routing table, with a packet destination address used as a key.

[Inter-Domain Communication Judging Module 26]

An inter-domain communication judging module 26 judges which domain the communication device of a destination belongs to, using packet header information and a name service (a program for showing an address corresponding to a host name of the communication device).

[Address Translation Module 27]

An address translation module 27 receives pieces of information (source addresses and destination addresses) before and after the translation from the inter-domain communication judging module 26. Based on these pieces of information, the address translation module 27 translates a content of a packet header.

[Packet Receiving Module 28]

A packet receiving module 28 monitors the physical interfaces 15a etc. Then, the packet receiving module 28 receives a packet from the network connected to the physical interface 15a etc.

[Packet Forwarding Module 29]

A packet forwarding module 29 controls the physical interfaces 15a etc., and forwards the packet to the network connected to the physical interface 15a etc.

[Routing control program 30]

A routing control program 30 executes a routing protocol. Namely, the routing control program 30 receives routing information 102 exchanged within the domain, and updates a routing table of the router itself in accordance with the routing information 102 received. Further, the routing control program 30 sets, in the routing information 102, network reachability to other network within the same domain from the router itself, a connection cost etc, and distributes the routing information 102 to other routers. The routing control program 30 in the first embodiment is prepared individually for every domain. Each of the routing control program 30 exchanges the routing information with a corresponding domain. The routing information per domain, which has been obtained as a result of the exchange, is stored per destination domain in the destination domain routing table 20.

Note that RIP (Routing Information Protocol; see RFC1058 (Request For Comments), a standard document about Internet) and OSPF (Open Shortest Path First; see RFC1131) are known as the routing protocols.

<Outline of Functions>

An outline of the functions of the router 3 will hereinafter be explained referring to FIG. 3.

(1) The router 3 receives the packet 100 destined to destination host by the packet receiving module 28.

(2) To start with, the route search module 25 searches the routing table (the receiving interface domain routing table 21) for the domain which the receiving interface belongs to. If the search hits a route in the receiving interface domain routing table 21, the route search module 25 processes the packet as intra-domain routing. Namely, the route search module 25 indicates the packet forwarding module 29 to forward the packet to an output interface.

The search does not hit any route in the receiving interface domain routing table 21, procedures indicated by the following items (3) through (8) are executed.

(3) The inter-domain communication judging module 26 searches the address translation table by forward lookups or reverse lookups, wherein the header information of the received packet and the receiving interface are used as keys. If the search hits by either the forward lookups or the reverse lookups, the inter-domain communication judging module 26 transfers the packet to the address translation module.

If the search does not hit, the inter-domain communication judging module 26 checks based on the packet header information, the destination domain routing table 20 and the domain definition table 22 which domain a destination address of the received packet belongs to. Next, the inter-domain communication judging module 26 checks which domain registered in the domain definition table 22 the receiving interface belongs to. Subsequently, the inter-domain communication judging module 26 refers to the inter-domain communication definition table 23, and judges a communicability between the domain to which the receiving interface belongs and the destination domain. Note that the inter-domain communication definition table 23 also shows an address translation rule.

(4) The inter-domain communication judging module 26, if communicable between the domain to which the receiving interface belongs and the destination domain, notifies the route search module 25 that the destination domain routing table 20 should be referred to.

(5) The route search module 25 is called from the inter-domain communication judging module 26 and searches the destination domain routing table 20. This search is done, wherein the destination address in the packet header information is used as a key.

(6) The address translation module 27 translates the packet header information according to the translation rule defined with respect to the packet in the inter-domain communication definition table 23.

(7) The packet forwarding module 29 forwards the packet to the searched output interface.

(8) The routing control program 30 is started for every domain and modifies the destination domain routing table 20 for the respective domains and the receiving interface domain routing table 21.

<Normal Procedure>

The followings are conditions of the inter network connections in the first embodiment.

[Connecting Condition 1] The intranet A (10.25.165.0) is, when the router 3 executes the address translation, communicable with the Internet.

[Connecting Condition 2] The intranet B (192.168.0.0) is connected via the router 3 to the Intranet C (192.172.0.0) conceived as a branch office.

[Connecting Condition 3] Both of the Intranets B and C are connectable via the router 3 to the Internet.

FIGS. 4 and 5 show processes of the relay control program 31 for establishing the connections described above. This relay control program 31 is executed by the CPU 14.

To begin with, the processes for the communication in the forward direction (in which a source communication device forwards the packet to a destination communication device), will be explained.

(1) Packet Receipt by Router 3

Now, supposing that the router 3 receives the packet via the interface de2 from the network 192.168.100.0 belonging to the domain 2, the discussion on the processes will be made based on this assumption. A destination address of this packet is 100.10.5.2, and a source address is 192.168.5.1.

(2) Judgement of Addressed-to-Relay-Device Packet

The CPU 14 of the router 3 at first judges whether or not this packet is a packet addressed to the router 3 itself (which is hereinafter expressed as "addressed-to-relay-device (or more simply "router-addressed"). This term "router addressed" may also be expressed as "node-addressed") (step S1 that will hereinafter be abbreviated to S1). The router-addressed packet is processed as a communication packet to the router 3 itself (S3).

In the first embodiment, the router-addressed packet may be defined as an administrative packet for the router 3. An issuance of this administrative packet is triggered for a network administrator by issuing a remote log-in to the router 3. An explanation of the administration itself of the router 3 is herein omitted.

Now, the packet is not categorized as the administrative packet, and therefore a judgement in S2 is negative (No). Accordingly, the CPU 14 advances the processing to a intra-domain communication judgement (S4).

(3) Intra-Domain Communication Judgement

Next, the CPU 14 judges whether or not this packet is addressed to a destination within the same domain (S4). This judgement involves searching the receiving interface domain routing table 21. If the search hits (Yes judgement in S5) this implies that the source domain corresponding to the receiving interface is identical with the destination domain. Namely, the packet may be routed to within the same domain (S6).

Whereas it the search does not hit (No judgement in S5) the processing is transferred to the inter-domain communication judging module 26 (S7). In this example, the CPU 14 proceeds with the control to a process in S7 because of not being the communication within the same domain.

(4) Processes by Inter-Domain Communication Judging Module 26, Address Translation Module 27 and Packet Forwarding Module 29

The inter-domain communication judging module 26 searches the address translation table 24 in FIG. 11, wherein the source address and the destination address of the received packet are use as keys. If the search hits in the address translation table 24 (Yes judgment in S8), the packet is sent together with a searched result to the address translation module 27 (S9). This indicates that the packet is the one of which the address should be translated in the communication in the forward direction. The address translation module 27 rewrites the packet header based on the searched result given to the address translation module 27 itself. Further, the CPU 14 obtains a forwarding interface from the address translation table 24 (FIG. 11).

Next, the CPU 14 transfers the control to the packet forwarding module 29, and the packet forwarding module 29 forwards the packet to the network via the above forwarding interface (S11).

If the above search does not hit (No judgement in S8), the CPU 14 transfers the control to a process shown in FIG. 5. To be specific, the CPU 14 searches the address translation table, wherein the destination address of the packet is used as a key for source address after being translated in the address translation table 24, and the source address of the packet is used as a key for destination address after being translated in the address translation table 24 (S12).

Herein, if the search hits (Yes judgement in S13), the CPU 14 judges that the packet concerned is a packet in a response communication (in the reversed direction) with respect to the communication in the forward direction. Then, the CPU 14 transfers the packet together with a searched result to the address translation module 27. Further, indicates an address reverse translation (S14). As a result, the CPU 14 rewrites the packet destination into a source address before being translated in the address translation table. Further, the CPU 14 obtains a reply destination interface (the receiving interface in FIG. 11) from the address translation table 24.

Next, the CPU 14 transfers the control to the packet forwarding module 29, and the packet forwarding module 29 forwards the packet via the forwarding interface to the network (S16).

If the search hits neither of them (No judgement in S13), the CPU 14 judges whether the communications over the domain are performed or not (processes in S17 and S18). These are processes needed when the inter-domain communications start afresh.

More specifically, the CPU 14 searches the whole of the destination domain routing table 20 with the destination address being used as a key, and thus obtains the forwarding interface.

Now, the destination address is 100.10.5.2, and hence the CPU 14 obtains the forwarding interface de0. Next, the CPU 14, with this forwarding interface using as a key, searches the domain definition table 22, thereby obtaining the destination domain. Now, the interface is the forwarding interface de0, and therefore the CPU 14 obtains the domain 0 as the destination domain. Further, the CPU 14 searches the domain definition table 22 with the receiving interface using as a key. The CPU 14, based on the interface number of the interface via which the packet is received and the domain definition table 22 (FIG. 6), obtains the domain 2 as the source domain (S17).

Subsequently, the CPU 14 searches the inter-domain communication definition table 23 shown in FIG. 7, wherein the source domain and the destination domain serve as keys (S18).

Now, this search hits (Yes in S19), it can be understood that a connection between these two domains is permitted. It can be also understood that a NAT-based address translation is specified.

Only the source address is translated according to NAT actualized in the first embodiment. This address translation involves the use of IP addresses pooled for every destination domain.

At this time, the CPU 14 registers a mapping of the address before being translated to the address after being translated in the address translation table 24 in FIG. 11 (S20).

Further, the CPU 14 registers the receiving interface and the forwarding interface in the address translation table 24 (S21).

Next, the CPU 14 transfers the control to the packet forwarding module 29, and the packet forwarding module 29 forwards the packet to the network via the forwarding interface (S22).

If it is judged in S18 that the connection between the two domains is prohibited (No judgement in S19), the CPU 14 discards the packet (S23).

<Effects>

According to what has been described so far, the destination domain routing table 24 can be referred to with respect to only the packet permitted by the inter-domain communication judging module 26 both in the forward direction and in the reverse direction, and it is therefore feasible to avoid a malicious packet from being mistakenly routed.

Moreover, the router 3 in the first embodiment separates the routing tables for every destination domain, and preferentially refers to the receiving interface domain routing table 21 at a stage of receiving the packet. Therefore, the search for the routing table with respect to the packet (to the destination within the same domain) addressed to the domain corresponding to the receiving interface, is limited to the routing table (the receiving interface domain routing table 21) corresponding to this domain. As a result, the routing of the packet addressed to within the same domain can be performed efficiently.

On the other hand, the inter-domain communication judging module 26 executes a process for eliminating the malicious packet intruding the Intranet from the Internet, and this process may be done against the packets other than those addressed to within the same domain.

Modified Example

In the first embodiment, the destination domain routing table 20 and the receiving interface routing table 21 are structured as those different from each other. The embodiment of the present invention is not, however, limited to this structure. For instance, the receiving interface routing table 21 may be structured as a part of the destination domain routing table 20.

As in the first embodiment, however, the destination domain routing table 20 is to take the table structure logically independent for every destination domain.

In this case, when the packet receiving module receives the packet, the domain definition table is searched, in which the interface receiving the packet serves as a key. Then, the receiving domain is thus determined, and a suitable domain routing table is selected.

In the first embodiment, the routing control program 30 is prepared individually for every destination domain. The embodiment of the present invention is not, however, limited to this architecture. For example, there may be provided one single routing control program 30 (which may be defined as one process on the CPU 14 that executes a routing protocol). In this case, this program may sequentially repeat the process of exchanging the routing information for every destination domain.

In the first embodiment, the router 3 sets the mapping of the interfaces de0, de1, de2 to the domains. The embodiment of the present invention is not, however, limited to this mapping. For instance, there may be set a mapping of the physical interfaces 15a, 15b or 15c directly to the respective domains without using the logical interfaces de0 etc. In this case, the physical interfaces 15a etc correspond to an interface module.

In the embodiment discussed above, the destination domain routing tables 20 are structured in separation for every destination domain as shown in FIGS. 8 through 10. The embodiment of the present invention is not, however, limited to the above structure. For example, as shown in FIG. 12, even when the destination domain routing table 20 is structured as one single table, the requirement may be such that the records constituting the table are separated for every destination domain.

The router 3 in the first embodiment, based on the destination address of the first packet communicated between the domains, searches the whole of all the destination domain routing tables, thereby obtaining the output interface. Then, the destination domain is determined from this output interface, and the inter-domain connectability between the source domain and the destination domain is judged (the processes in S17 and S18 in FIG. 5). The embodiment of the present invention is not, however confined to such processing steps. Namely, taking into consideration a case where there is an overlap of address between the destination domain routing tables, the process in S18 may be executed in advance. To start with, the inter-domain communication definition table 23 is searched, thereby determining the receiving domain with the communications permitted. Then, it is also feasible to obtain the output interface by searching only the routing table of the domain with such communications permitted (which corresponds a mode in which the process in S18 in FIG. 5 is executed in advance, and the process in S17 is executed afterwards).

Second Embodiment

Figure 13:
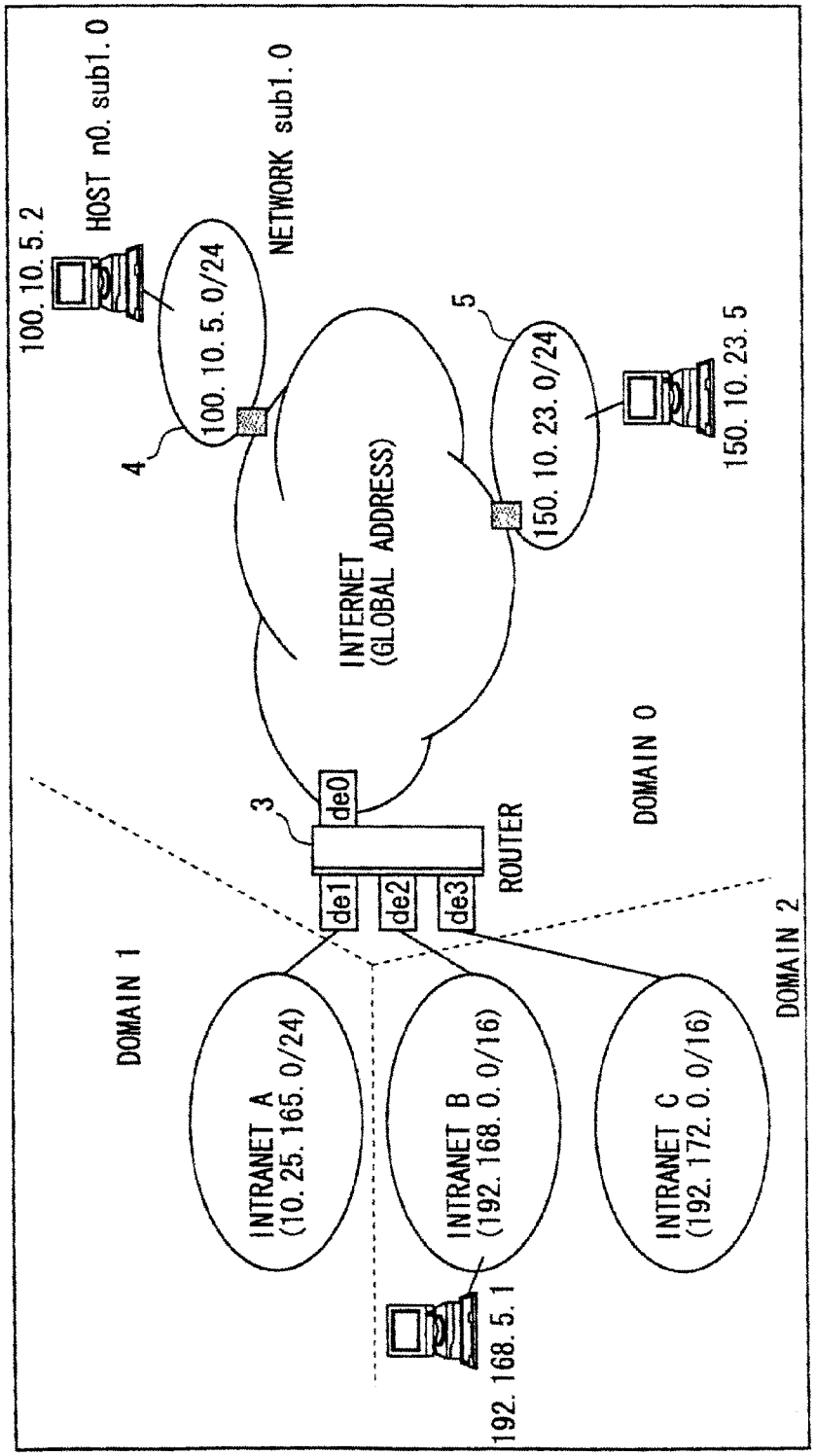
FIG. 13 is a view showing a network architecture in a second embodiment of the present invention.
Figure 14:
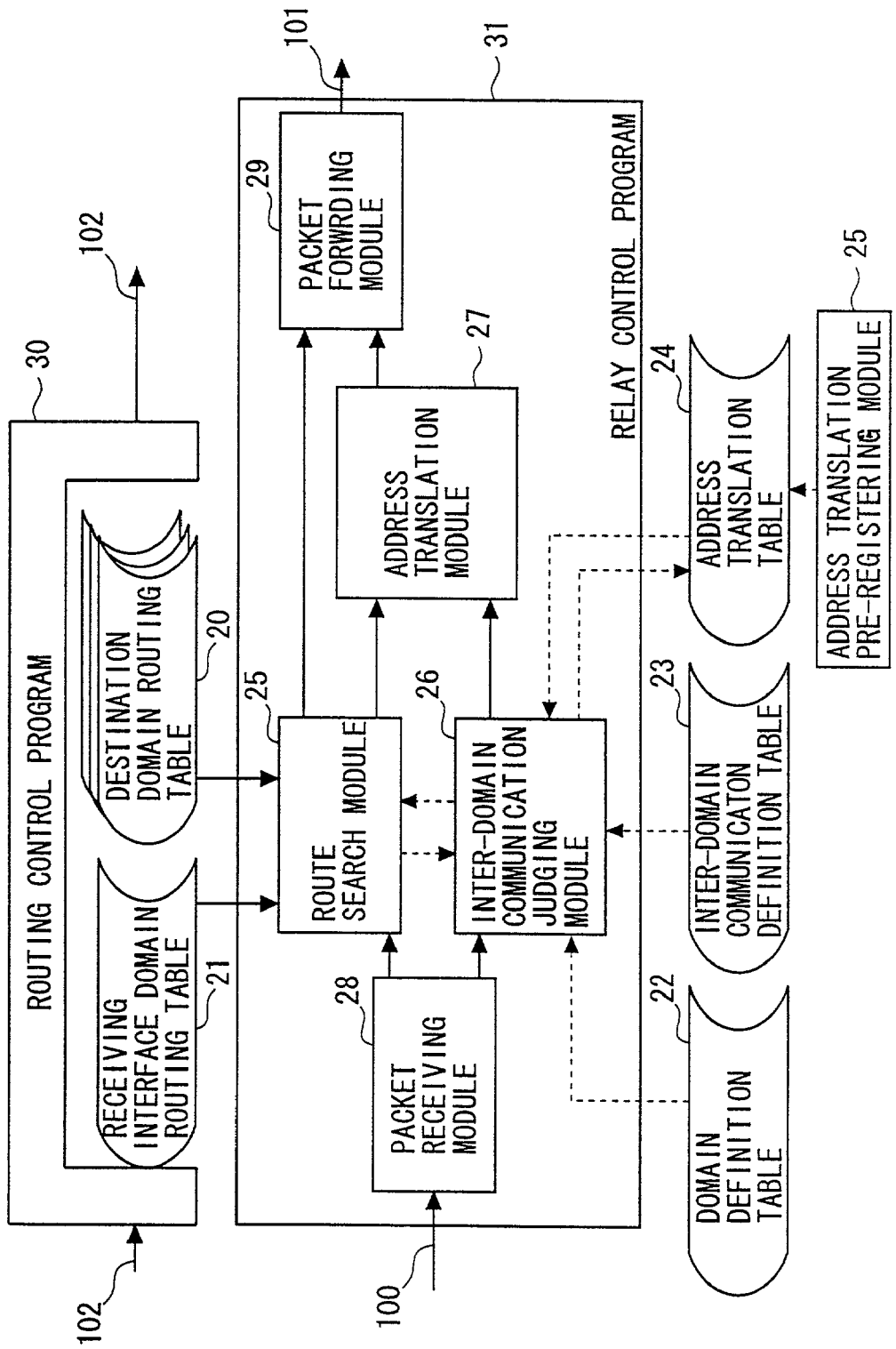
FIG. 14 is a view showing an architecture of functions of the router in the second embodiment of the present invention.
Figure 15:
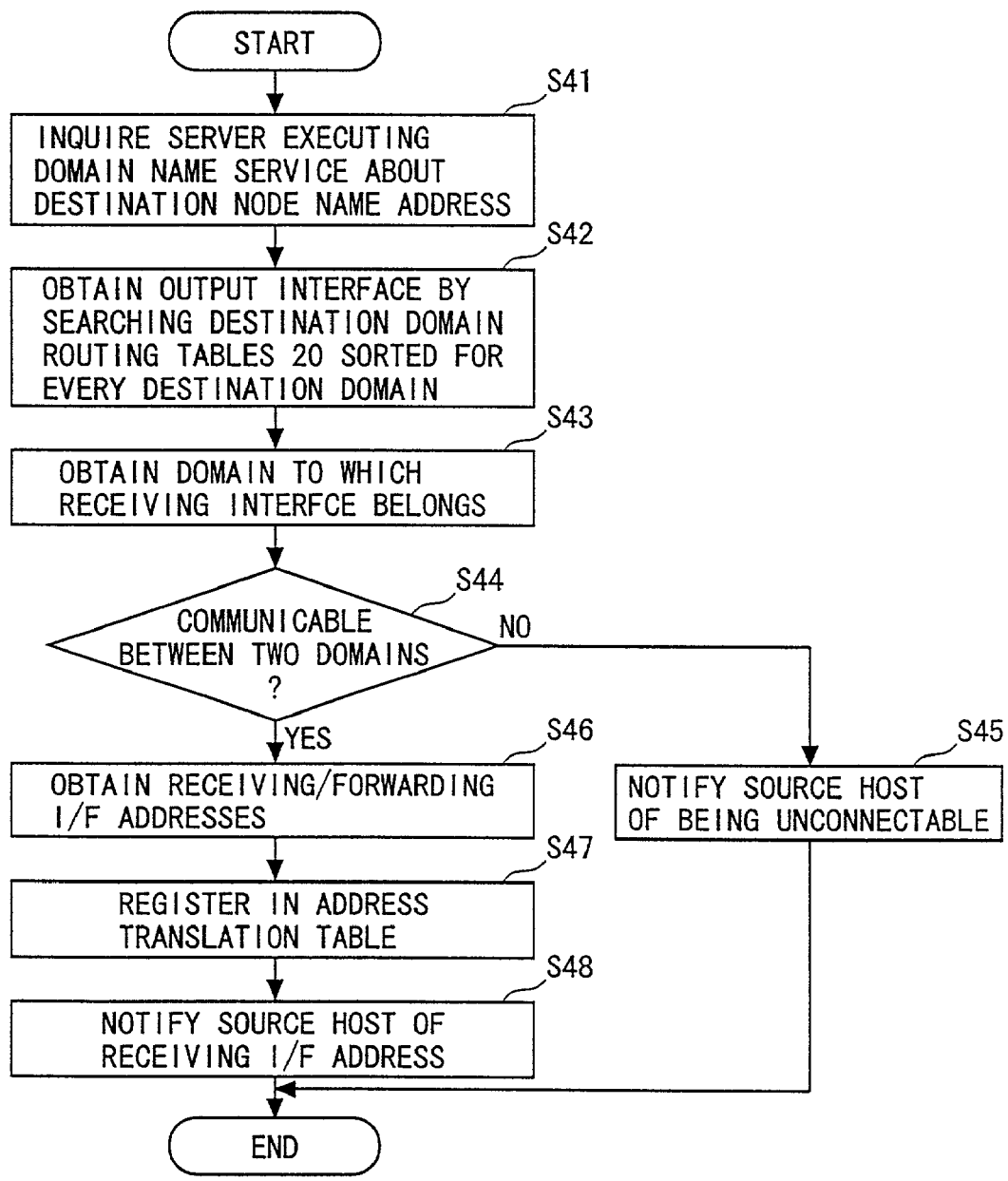
FIG. 15 is a flowchart showing processes of an address translation pre-registering module.
Figure 17:
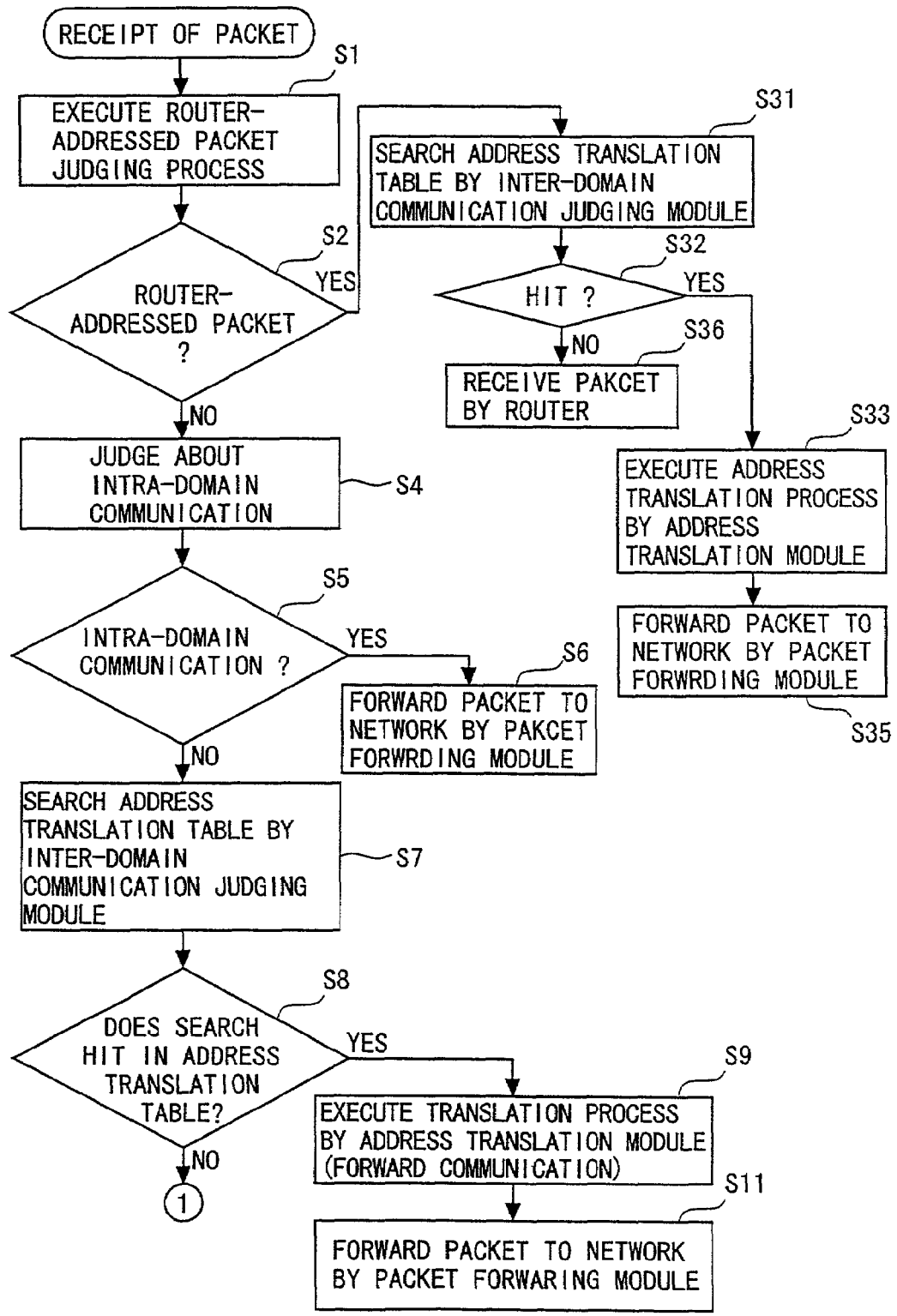
FIG. 17 is a flowchart showing a forwarding process with an address of a receiving interface.

A second embodiment of the present invention will hereinafter be described with reference to FIGS. 13 through 17. FIG. 13 is a view showing a network architecture in the second embodiment. FIG. 14 is a diagram showing an architecture of functions of the router 3 in the second embodiment. FIG. 15 is a flowchart showing processes by an address translation pre-registering module 25 executed by the CPU 14 of the router 3. FIG. 16 is a diagram showing a result of processing by the address translation pre-registering module 25. FIG. 17 is a flowchart showing processes of the relay control program 31 executed by the CPU 14 of the router 3.

The first embodiment discussed above has exemplified the router 3 provided with the destination domain routing table 20 and the receiving interface domain routing table 21. In this case, the route to the domain 0 is already known by the domain 2 in the first embodiment discussed above.

The second embodiment will deal with a routing process in a case where the two domains connected to the router 3 are uninformed of their routes to each other. It is, however, assumed that the source domain has a means for knowing an address within the other domain from a host name of the other domain. Other configurations and operations are the same as those in the first embodiment and marked with the same numerals, and their repetitive explanations are omitted. Further, as the necessity may arise, the drawings in FIGS. 1 through 12 are referred to.

<Architecture>

FIG. 13 is a view showing a network architecture in the second embodiment. The second embodiment will deal with the router 3 for connecting the domain 0 to the domain 2 that are uninformed of their routes to each other.

As shown in FIG. 13, the domain 0 contains a network 4 with a name of sub1.0. Further, a host having a host name of n0.sub1.0 is connected to the network 4. An address of this host n0.sub1.0 is 100.10.5.2.

Further, a host specified by its address 192.168.5.1 is connected to the domain 2. The domain 0 and the domain 2 are uninformed of their routes to each other. In the second embodiment, however, it is assumed that the host 192.168.5.1 of the domain 2 knows the host name n0.sub1.0 of the destination host.

In such a case, according to the second embodiment, the source host 192.168.5.1 is capable of inquiring the router 3 about an address corresponding to a name of the destination.

FIG. 14 shows an architecture of the functions of the router 3 in the second embodiment. The architecture in FIG. 14 is a different from the architecture in the first embodiment illustrated in FIG. 3 in terms of such a point that the address translation pre-registering module 25 (corresponding to an destination address search module) is added.

The address translation pre-registering module 25 has a function of registering the address translation table 24 in advance with pieces of information before and after being translated.

<Processes in Address Translation Pre-registering Module 25>

Given hereinafter is an explanation of processes executed when the source host 192.168.5.1 inquires the router 3 about a destination address corresponding to a host name of the destination.

FIG. 15 shows the processes of the address translation pre-registering module 25, which are executed by the CPU 14 of the router 3. To begin with, the CPU 14 inquires an unillustrated server which implement a name service (RFC921) about an address within the domain 0 that corresponds to the host name n0.sub1.0 of that destination (S41). As a result, the CPU 14 obtains an address 100.10.5.2 of the destination host.

Next, the CPU 14 searches the destination domain routing tables 20 which is separated according to the destination domains, on the basis of the domain number 0 of the destination host, thereby obtaining the output interface de0 (S42).

Subsequently, the CPU 14 obtains the domain 2 to which the receiving interface de2 belongs as in the first embodiment (S43).

Next, the CPU 14 judges based on the inter-domain communication definition table 23 about a connectability between the two domains (the connectability from the domain 2 to the domain 0) (S44). If the communication between the two domains is not permitted (No judgement in S44), the router 3 notifies the source host 192.168.5.1 of a fail of name resolution (S45).

Whereas if the communication from the domain 2 to the domain 0 is permitted (Yes judgement in S44), the CPU 14 obtains an Alias address 192.168.5.2 in the domain 2 that is pooled beforehand (S46) (This Alias address is hereinafter called a receiving interface address). Further, the CPU 14 obtains an Alias address 120.10.4.2 (This Alias address is hereinafter called a forwarding interface address) in the domain 0 that is pooled beforehand.

Then, the CPU 14 registers, in the address translation table 24, the source address 192.168.5.1, the receiving interface address 192.168.5.2, the receiving interface de2, the forwarding interface address 120.10.4.2, the destination address 100.10.5.2 and the forwarding interface de0 (S47). FIG. 16 shows a result of this registration.

Next, the router 3 notifies in advance the source host 192.168.5.1 of this receiving interface address 192.168.5.2 as a result of name resolution (S48). With this notification, the source host 192.168.5.1 gets informed that the packet can be forwarded to a desired destination host n0.sub1.0 if the packet is sent to the receiving interface address 192.168.5.2.

The processes described above are executed between the source host 192.168.5.1 and the router 3 in advance of the performing the communications. After this sort of setting has been done, the router 3 having received the packet addressed to the receiving interface address 192.168.5.2 translates its address into an address 100.10.5.2 in accordance with the address translation table 24, and forwards the packet from the output interface de0. As a result, the packet is routed to the domain 0 from the domain 2.

<Connecting Procedure Based on Receiving Interface Address>

FIG. 17 is a flowchart showing forwarding procedures based on the receiving interface address. The CPU 14 of the router 3 executes these forwarding procedures as the relay control program 31.

(1) Receipt of Packet

Now, a process executed when the router 3 receives the packet from a network 192.168.0.0 belonging to the domain 2 via the interface de2, will be explained. A destination address of this packet is 192.168.5.2 (the receiving interface address) and a source address is 192.168.5.1.

(2) Judgement of Router-Addressed Packet

At first, the CPU 14 of the router 3 judges whether this packet is a router-addressed packet or not (S1).

In the second embodiment, the router-addressed packet may be defined an environment setting packet addressed to the router 3 itself, or a packet addressed to the receiving interface address notified.

Now, the packet is the packet addressed to the receiving interface address, and hence a judgement in S2 is affirmative (Yes). Accordingly, the CPU 14 proceeds with the control to the processes from S31 onward.

(3) Processing of Router-Addressed Packet

Next, the CPU 14 searches the address translation table 24, wherein the source address 192.168.5.1 and the destination address 192.168.5.2 are used as keys (S31).

This couple of addresses given above are already registered in the address translation table 24 (see FIG. 16), and therefore this search hits (Yes judgement in S32). Then, the CPU 14 proceeds with the control to processes from S33 onward.

To be specific, the CPU 14 executes the address translation module 27 (S33). As a result, it obtaines the forwarding interface de0 and the destination address 100.10.5.2 within the domain 0 that corresponds to the receiving interface address 192.168.5.2.

Next, the CPU 14 executes the packet forwarding module 29, thereby forwarding the packet to the destination address 100.105.2 from the forwarding interface de0.

(4) Packet Reply Procedures

Processes of a reply packet from the destination host 100.105.2 are the same as the processes from S12 to S16 in the flowchart in FIG. 5 explained in the first embodiment, and hence their repetitive explanations are omitted.

The router 3 is provided with the address translation pre-registering module 25, whereby the packet can be routed to between the two domains that do not exchange the routing information with each other.

Further, in the router 3 in the second embodiment, the destination domain routing tables 20 are structured in separation for every destination domain. Accordingly, even if a private address is overlapped in the plurality of domains, the address translation pre-registering module 25 is capable of obtaining a proper output interface from the destination domain routing table 20.

<Modified Example>

The second embodiment has dealt with the router 3 for connecting the two domains that do not exchange the routing information with each other. The embodiment of the present invention is not limited to the characteristics of the inter-domain connection described above. Namely, the present invention can be similarly embodied even in such a case that only one of the two domains to which the packet is routed have the routing information to the other domain.

Third Embodiment

The discussion on the first embodiment has focused on the router 3 provided with the destination domain routing table 20 and the receiving interface domain routing table 21.

A third embodiment will exemplify the router 3 for causing a server (corresponding to a communication data processing device) on other domain to execute one of the functions provided by the address translation module 27 in the architecture in the first embodiment. For example, one of those functions is content check.

Figure 18:
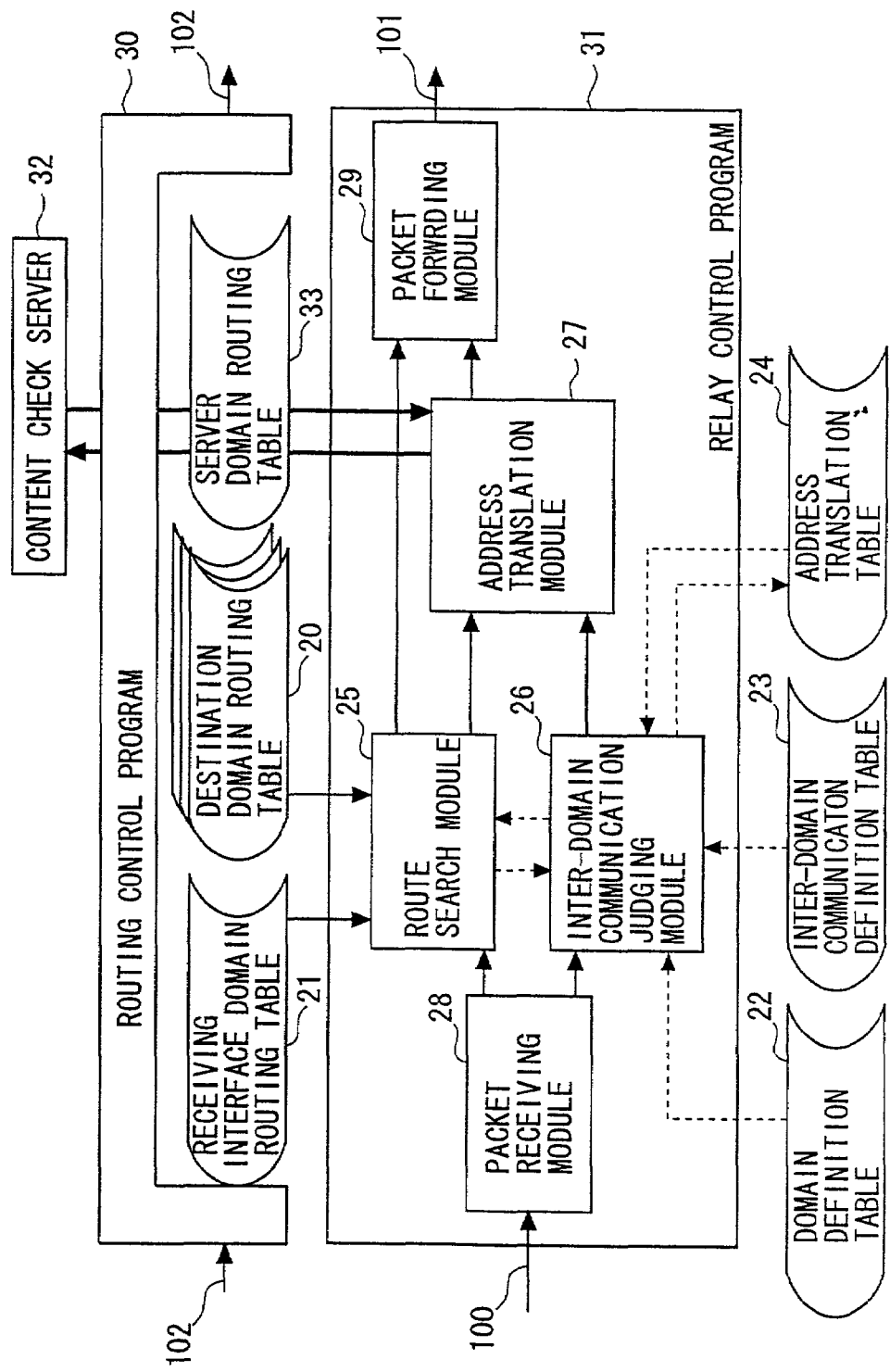
FIG. 18 is a diagram showing an architecture of functions of the router in a third embodiment of the present invention.
Figure 19:
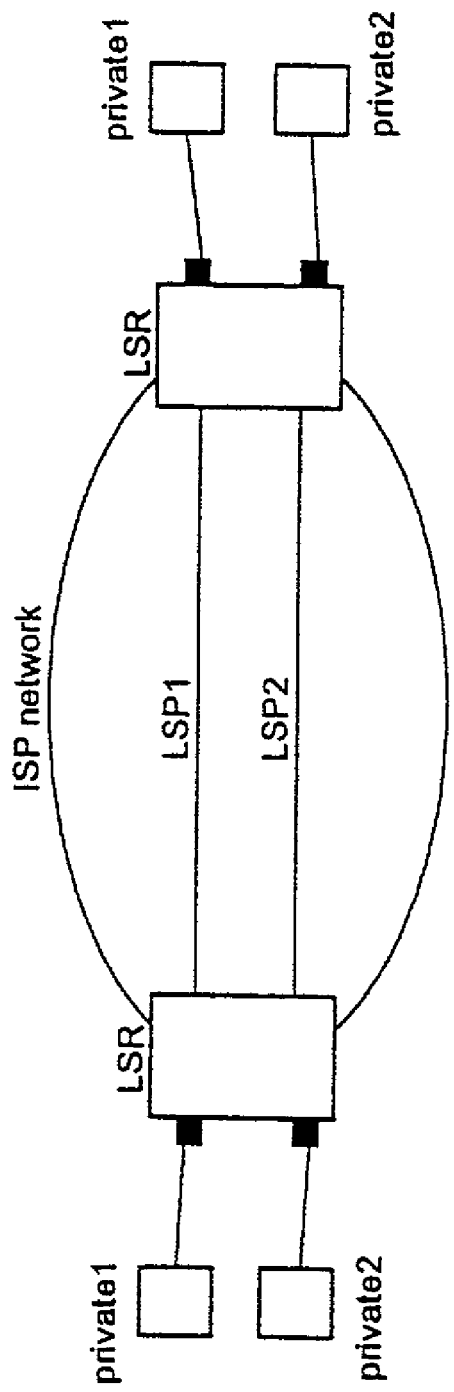
FIG. 19 is a view showing an outline of a prior art LSP (label Switch Path)
Figure 20:
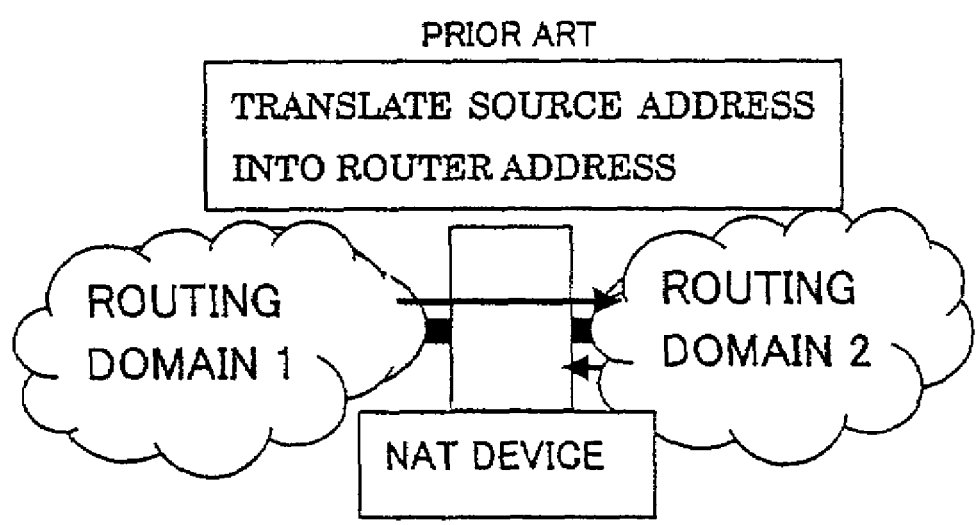
FIG. 20 is a view showing an outline of a unidirectional NAT in the prior art.
Figure 21:
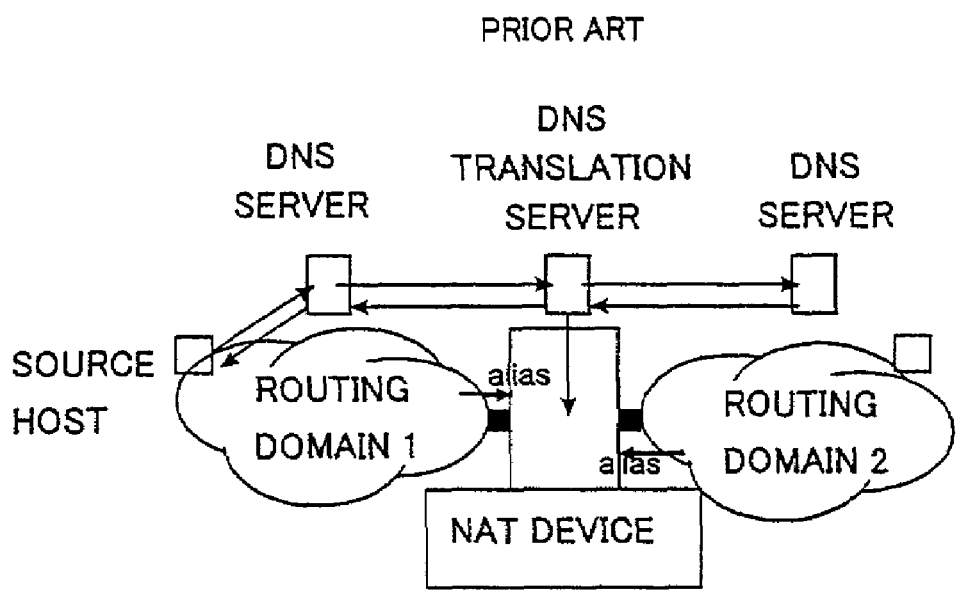
FIG. 21 is a view showing an outline of a bidirectional NAT in the prior art.
Figure 22:
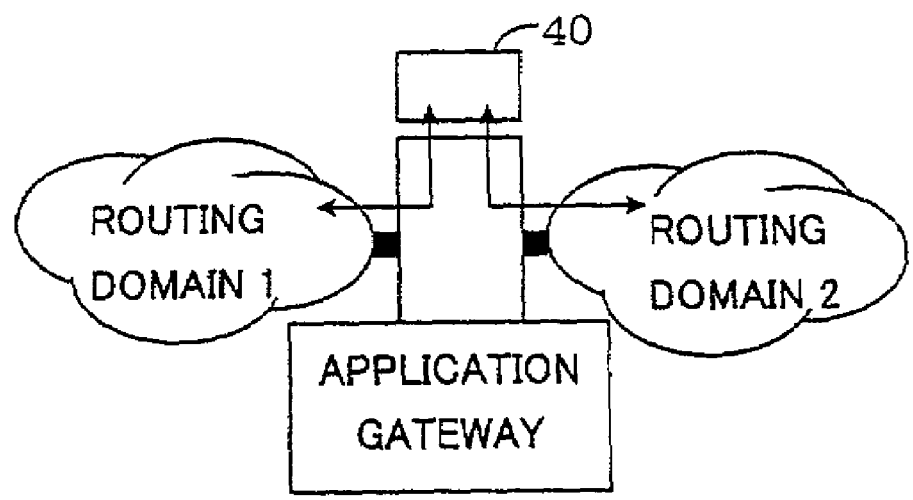
FIG. 22 is a view showing an outline of an application gateway in the prior art.

The third embodiment of the present invention will be explained referring to FIG. 18. FIG. 18 is a diagram showing an architecture of the functions of the router 3 in the third embodiment. FIG. 18 is different from FIG. 3 in terms of such a point that a server domain routing table 33 of the router 3 and a content check server 32 are added. Other configurations and operations are the same as those in the first and second embodiments, and the same components are marked with the same numerals, of which the repetitive explanations are omitted. Further, as the necessity may arise, the drawings in FIGS. 1 through 17 are referred to.

As shown in FIG. 18, the CPU 14 of the router 3 in the third embodiment includes the server domain routing table 33 stored with the routing information to the server. The CPU 14 searches this server domain routing table 33. The CPU 14, based on a result of this search, translates an address of the packet to be forwarded into an address to the content check server 32. Next, the CPU 14 receives the packet with the content check finished. Subsequently, the CPU 14 executes a reverse translation of the address of that packet into an address to the original destination domain.

Thus, the content check server 32 is made to execute the content check, thereby reducing a load on the router 3 and enabling a high-speed routing process.

What is claimed is:

1. A communication data relay system for relaying between two or more domains each configured by one or more networks, a relay source domain having routing information to a relay destination domain, comprising:

two or more interface modules for accessing said networks;

a domain definition module for defining a domain configured by said one or more networks, said domain definition module storing an interface identifier for identifying an interface module in association with a domain identifier for identifying said domain, wherein a set of one or more networks, each connected to interface modules identified by one ore more interface identifiers corresponding to said domain identifier is defined as said domain;

an inter-domain communication definition module for defining connectability between said two or more domains defined by said domain definition module, said connectability based on a combination of the following parameters: a source/destination domain identifier, an inter-domain communicability field, and a translation rule;

a routing information storage module for storing domain routing information corresponding to each of said two or more domains defined by said domain definition module, said domain routing information including a destination network address to which a packet is sent, a next-hop gateway address to which said packet is relayed, an output interface identifier for identifying the interface module to which said packed is output, and said domain identifier defined in said domain definition module for identifying the correspondence between said domain routing information and each of said two or more domains defined by said domain definition module; and a relay control unit for controlling relay of the communication data, said relay control unit acquiring the source domain of the packet by referring to the domain definition module with the receiving interface name, and acquiring destination domain by referring to a routing information storage module with the destination address, and judging whether communication between the domains is permitted or not for the relay on the basis of said inter-domain communicability field which is held in said inter-domain communication definition module and defined for each combination of source domain identifier and destination domain identifier, in the case of a relay within said domain, controlling the relay of the communication data with reference to said domain routing information corresponding to the domain concerned, in the case of a relay between the domains different from each other, when communication is judged to be permitted, the relay control unit translates address information included in the communication data on the basis of said translation rule which is held in said inter-domain communication definition module and defined for each combination of source domain identifier and destination identifier, and wherein said relay control unit maps registers a mapping in an address translation table, said address information before being translated to said address information after being translated, and relays the communication data between the domains different from each other on the basis of said mapping information registered in said address translation table.

2. A communication data relay system according to claim 1, further comprising a destination address search module for the relay destination domain, wherein if the relay source domain does not have routing information to the relay destination domain, said destination address search module searches a destination address to the relay destination domain in response to a request from a source communication device within the relay source domain, and notifies said source communication device of a relay address within the relay source domain that corresponds to the destination address, and said relay control unit relays the communication data addressed to the relay address to the destination address in the relay destination domain.

3. A communication data relay system according to claim 1, further comprising a routing control information storage module to the domain to which a communication data processing device for processing the communication data is connected, wherein said relay control unit, when controlling the relay of the communication data, causes said communication data processing device to process the communication data, and relays the thus processed communication data.

* * * * *